United States Patent [19]

Ancker-Johnson

[11] 3,795,803

[45] Mar. 5, 1974

[54] RADIANT ENERGY OPTICAL DETECTOR AMPLIFIER

[75] Inventor: Betsy Ancker-Johnson, Seattle, Wash.

[73] Assignee: The Boeing Company, Seattle, Wash.

[22] Filed: Sept. 21, 1972

[21] Appl. No.: 290,993

[52] U.S. Cl. .......... 250/338 H, 250/211 J, 307/307, 317/235 N

[51] Int. Cl. .......... H03k 3/38

[58] Field of Search ..... 250/83.3 H, 211 J; 307/307; 317/235 N

[56] References Cited

UNITED STATES PATENTS

| | | | |
|---|---|---|---|
| 3,501,638 | 3/1970 | Compton et al. | 250/83.3 H |
| 3,617,820 | 11/1971 | Herzog | 317/235 N |
| 3,591,431 | 7/1971 | Pruett | 317/235 N |
| 3,519,894 | 7/1970 | Hall | 307/307 |
| 3,001,133 | 11/1961 | Koenig et al. | 307/307 |

*Primary Examiner*—Harold A. Dixon
*Attorney, Agent, or Firm*—Christensen, O'Connor, Garrison & Havelka

[57] ABSTRACT

A semiconductor device of certain p-type materials, such as indium antimonide (InSb), is capable of impact ionization initiated by injection of electrons if maintained within a certain temperature range, e.g., 50°– 120° K. A long npp+ InSb diode is maintained in a controlled temperature environment at 77°K. An external biasing source reverse biases the diode's p+—p junction to block injection of electrons from the source and creates a relatively high electric field within the diode. When electrons are optically injected into the cathode end of the diode adjacent the p+—p junction by, for example, exposing the cathode region to infrared radiation, they initiate an impact ionization wave which travels the length of the diode in the very short time. When the impact ionization wave reaches the diode's anode, the resultant current through the diode is many times higher than the current initiated by the photoelectric effect without impact ionization. This current is used to signify fast detection of infrared radiation in small quantities and may also be used, in conjunction with the known applied electric field, to indicate the amount of incident radiation.

11 Claims, 4 Drawing Figures

RADIANT ENERGY OPTICAL DETECTOR AMPLIFIER

BACKGROUND OF THE INVENTION

The present invention relates to a semiconductor device, and more particularly, to a circuit means and semiconductor device which provide a high-gain, low-noise amplifier for detection of radiant energy, especially infrared radiation.

For detection of minute quantities of radiant energy, especially infrared radiation, one common device in the prior art is the photomultiplier tube. However, the photomultiplier tube has inherent disadvantages, such as poor reliability, short life, and additionally requires complex electronics for its operation. Semiconductor diodes also have been used which include a p-n junction reverse biased by an applied biasing voltage somewhat below the avalanche or breakdown voltage for the junction. By exposing the diode to radiation, the junction breaks down and avalanches, thereby producing high current multiplication and resultant detection of small quantities of radiation. Although these devices appear to be superior to the photomultiplier tube in terms of reliability and life, they still have a relatively slow response time and require a carefully controlled biasing voltage for proper operation.

It is therefore an object of this invention to provide a semiconductor diode capable of very fast detection of minute quantities of radiant energy.

It is another object of this invention to provide such a fast detector using semiconductor material which can provide a quantitative measurement of the amount of detected radiant energy.

SUMMARY OF THE INVENTION

The present invention provides a high-speed amplification circuit responsive to photoelectrons injected by radiant energy comprising: a long npp+ semiconductor diode means having a cathode region and an anode region, said diode means being of p-type material and capable of impact ionization in response to electron injection into the cathode end of said diode adjacent said cathode region when maintained within a predetermined range of temperatures, means maintaining said diode means at one of said temperatures in said range, and source means for reverse biasing the diode junctions with a voltage sufficient to produce an electric field within the diode to allow impact ionization to occur upon photoelectronic injection into said cathode end region, but not high enough to cause breakdown of the diode junctions.

BRIEF DESCRIPTION OF THE DRAWINGS

A better understanding of the present invention can be acquired by reading the ensuing specification in conjunction with the accompanying drawings, in which.

DESCRIPTION OF A PREFERRED EMBODIMENT

Figure 1:
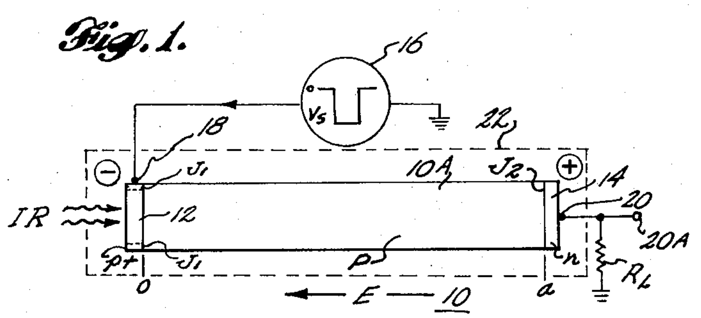
FIG. 1 is a schematic diagram of the circuit and diode of the present invention.

The present invention achieves its fast detection times and high gain by utilizing the phenomenon of impact ionization. The impact ionization phenomenon has been recorded and verified in several types of semiconductor materials. The physical conditions for initiation of impact ionization in a semiconductor depend on whether the semiconductor is p-type material or n-type material. In either case, it is necessary that electrons be removed from their valence band and be elevated to a conduction band. This elevation occurs through electron collisions with already "free" conduction electrons which transfer the requisite energy to the valence electrons. Generally, under the condition producing impact ionization, the initiating electrons have sufficient density and energy to knock electrons out of the valence band into the conduction band and to transmit to the newly produced conduction electrons sufficient energy so that they may in turn engage in additional ionizing collisions. Stated another way, it must be statistically probable that the initiating conduction electrons produce a "chain-reaction" in which the number of conduction electrons multiplies rapidly.

In order for this process to occur, the material must be maintained within a range of rather low temperatures and must be subjected to an electric field of a minimum magnitude, so that sufficient energy is imparted to the conduction electrons. It is preferred that the energy gap between the valence and conduction bands be relatively small so as to limit the magnitude of biasing voltage required. In addition, there must be a sufficient number of free or conducting charge carriers in the semiconductor material. In certain p-type materials, such as indium antimonide (InSb), it has been estimated that neither the thermal equilibrium electrons nor the holes initiate impact ionization, presumably because the thermal equilibrium electrons are too few in number to start an avalanche and the holes are too massive to acquire the requisite energy for ionizing collisions in the times observed for impact ionization with given applied fields. Rather, it has been shown that injected electrons are required to initiate impact ionization in p-type InSb.

When p-type InSb is subjected to an externally-applied electric field having a strength from a few volts/cm to approximately 500 volts/cm, both electrons and holes are injected from the source in large quantities and in approximately equal densities. It is known that the excess electrons which are injected at the cathode of the material propagate to the anode behind a well-defined leading edge, or wavefront, with velocity dependent on electric field strength. After the wavefront reaches the anode, the excess carrier conductivity in the material, $\alpha_{ex}(x)$ and therefore current increases exponentially with time to a non-equilibrium steady state condition. The average velocity for this wavefront is on the order of $5.6 \times 10^6$ cm/sec. Within the material, the localized electric field strength $E(x)$ decreases behind the front and increases ahead of it.

For impact ionization to occur in p-type InSb, the electric field strength $E(x)$ at any point within the material must exceed a threshold field strength $E_{tip}$. The lowest measured value of $E_{tip}$ for injection from a voltage source has been 490 volts/cm. When electrons are injected and accompanied by average fields that greatly exceed $E_{tip}$, e.g., $\overline{E}$= 1200 volts/cm, they initiate an avalanche process once they penetrate the material a very short distance, too short to measure with existing techniques, but probably approximately 10 μm. After the injected electrons produce impact ionization in a thin layer at the cathode of the material, the field E(x) there drops and increases elsewhere in the material, as the average applied field $\overline{E}$ is constant. The newly produced conduction electrons at the front of this thin layer then acquire drift velocities even greater than the injected electrons had and cause impact ionization in an adjacent layer of the material. Thus, the impact ionization wavefront, initiated adjacent to the cathode, propagates along the length of the device to the anode.

If the electron injection is accompanied by average fields $\overline{E}$ less than that required for producing impact ionization immediately after injection, e.g., less than 1200 volts/cm, the injected electrons will penetrate some distance into the material before impact ionization is initiated when the localized field E(x) exceeds $E_{tip}$. If the average field $\overline{E}$ is below a certain value, approximately 300 volts/cm, the localized field strength E(x) can never exceed $E_{tip}$ and a wavefront composed of injected electrons only traverses the device.

Figure 2:
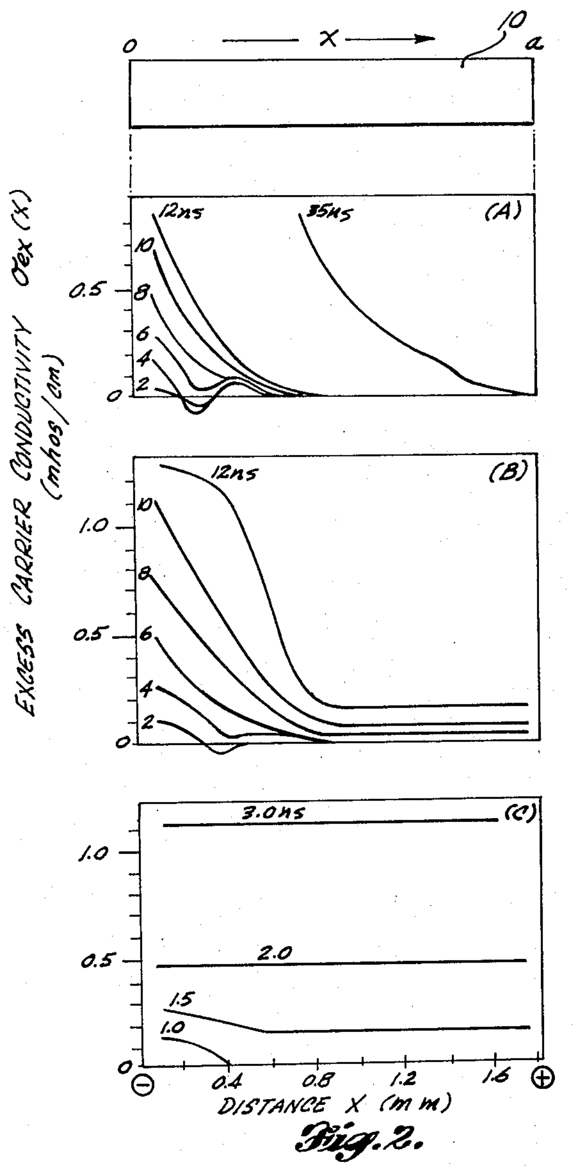
FIG. 2 illustrates the variation in excess carrier conductivity in the p region of the diode along the diode's length, for three different applied electric fields and for successive times after the application of the fields.
Figure 3:
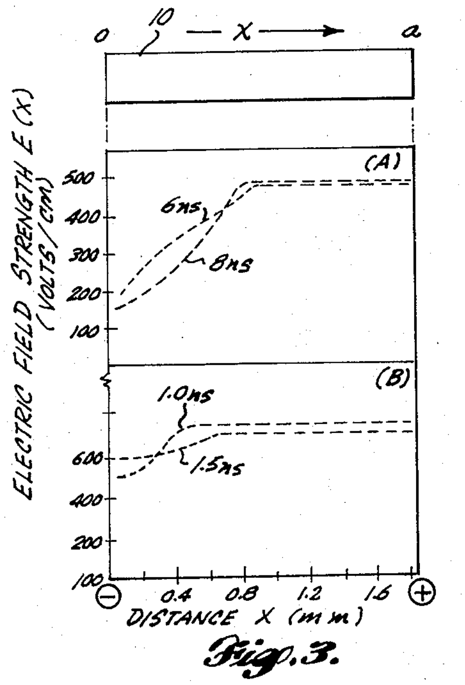
FIG. 3 illustrates the variation in electric field strength along the diode's length, for two different applied electric fields and for successive times after the application of the fields.

The phenomena of injection and impact ionization can be better understood by considering the graphs in FIGS. 2 and 3. In FIG. 2, a sample 10 of InSb is shown having a cathode at $x = 0$ and an anode at $x = a$. In one embodiment, $a$ = 1.83 mm. Curves (A) of FIG. 2 illustrate the excess carrier conductivity $\alpha_{ex}(x)$ along the device for a period of time from 2 to 50 nanoseconds (ns) after the application of an average electric field $\overline{E}$ = 170 volts/cm at time $t = 0$. In this case, E(x) is everywhere less than $E_{tip}$, and hence conduction is a result of only electron injection at the cathode. The passage of the injection wavefront from the cathode to the anode is illustrated by the increase in $\alpha_{ex}(x)$ with time. The time required for the wavefront to reach the anode after application of the electric field is approximately 32 nanoseconds, in this example.

In Curves (B) of FIG. 2, the variation in $\alpha_{ex}(x)$ is shown for a time period from 2 to 12 nanoseconds after the application of an average field $\overline{E}$= 420 volts/cm at time $t = 0$. Since $\overline{E}$ is less than $E_{tip}$, conduction is initially by injection. Thus, at 6 nanoseconds, the injection wavefront has travelled approximately 0.8 mm from the cathode at $x = 0$. However, at 8 nanoseconds, impact ionization has occured and the impact ionization wavefront, signified by a uniform conductivity $\alpha_{ex}(x)$, has travelled at a very high rate of speed toward the anode at $x = a$. The required time for the injected and impact ionization waves to travel to the anode was measured to be 8.4 nanoseconds after the application of the external electric field. Impact ionization occurs at approximately 0.9 mm from the cathode, in this example.

As previously explained, the localized field E(x) increases ahead of an injection wavefront. With reference now to Curves (A) in FIG. 3, which show E(x) for the applied field $\overline{E}$ = 420 volts/cm of Curves (B) in FIG. 2, it can be seen that at 6 nanoseconds, the localized field E(x) is at no place greater than $E_{tip}$, that is, 490 volts/cm, in this case. However, the field E(x) is increasing with time and at 8 nanoseconds, the field E(x) has exceeded 490 volts/cm at 0.9 mm and impact ionization is initiated.

Once the impact ionization wavefront is formed, it travels so fast through the remainder of the device 10 that, with increasing time, a uniformly distributed, growing conductivity $\alpha_{ex}(x)$ is observed in the anode half again with reference to Curves (B) in FIG. 3.

Curves (C) of FIG. 2 shows $\alpha_{ex}(x)$ for an external applied field $\overline{E}$= 710 volts/cm at time $t = 0$. In this case, very little injection occurs before impact ionization is initiated. By a comparison with Curves (B) of FIG. 3, which show the corresponding variation in localized electric field strength E(x), it can be seen that E(x) exceeds $E_{tip}$ at approximately 1.0 nanoseconds, at which time the injection wavefront is propagated approximately 0.5 mm from the cathode. The measured transit time in this case is 1.4 nanoseconds. Again, a uniformly distributed, growing conductivity is observed. From these measurements, the velocity of the impact ionization wavefront in p-type InSb at 77° K has been calculated to equal 3.2 × $10^8$ cm/sec.

Once the impact ionization wavefront is initiated, the conductivity $\alpha_{ex}(x)$ increases exponentially to a steady-state value and remains high until the external electric field is removed.

A semiconductor device in which impact ionization may occur is thus an extremely fast device capable of providing extremely fast detection of small quantities of injected electrons, if the device is connected in an electric circuit in which conductivity, and thus current through the device can be measured.

In the present invention, the injected electrons to be detected are produced by the photoelectric effect, and injection of electrons from the biasing source providing the external applied field is blocked by constructing the device as an npp+ diode and reverse biasing the diode junctions below their breakdown voltage by controlling the polarity and magnitude of the applied biasing voltage.

Figure 1A:
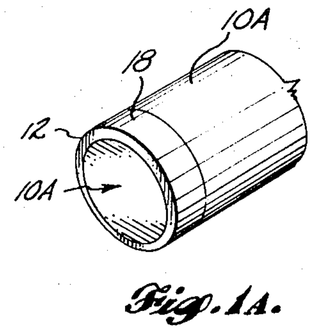
FIG. 1A is a pictorial view showing the cathode region of the diode.

Turning now to FIG. 1, a block 10 of p-type InSb is fabricated as a long npp+ diode having a p+-type cathode region 12 and an n-type anode region 14. Cathode region 12 and the resultant p-type region 10A establish a junction *j1* and p-type region 10A and anode region 14 establish a junction *j2*. Cathode region 12 is fabricated to permit radiant energy, such as infrared radiation IR, to fall directly upon the cathode end of the p-type region 10A. One type of fabrication is shown in FIG. 1A, in which the cathode end of p-type region 10A is exposed to infrared radiation IR by the construction of an annular cathode region 12. Alternatively, an optically transparent cathode region 12 could be used.

The block 10 is maintained in a controlled temperature environment 22 by means, not illustrated, which are conventional in the art. The temperature of the environment 22 is dependent on the range of temperatures at which the p-type material comprising block 10 has the capability of providing significant impact ionization. For p-type InSb, 80° K is preferred.

In order to obtain the necessary field strength for impact ionization, a biasing voltage source 16 is connected from ground to an electrical contact 18 on cathode region 12. To obtain an output signal, a load resistor $R_L$ is connected from ground to an electrode 20 on anode region 14. The device's output signal appears on terminal 20A.

Biasing voltage source 16 provides an output voltage pulse of magnitude $V_s$ with respect to ground potential. $V_s$ must be chosen so that the localized field strength $E(x)$ at some point within the p-type region 10A exceeds $E_{tip}$ upon electron injection to allow impact ionization to occur. The polarity of $V_s$ with respect to ground potential reverse-biases junctions *j1* and *j2*. Reverse biasing junction *j2* provides no barrier to the passage of electrons thereacross, as is well known. However, reverse biasing junction *j1* blocks injection of electrons from p+ cathode region 12, as long as the magnitude $V_s$ is less than the breakdown voltage of junction *j1*. Accordingly, impact ionization in the p-type region 10A does not occur until electrons are injected from some other source. In the present invention, the exposure of the p-type region 10A to infrared radiation IR causes injection of electrons due to well-known photoelectric effect. These injected photoelectrons then travel toward the anode region 14 in an injection wavefront in the manner previously described for injection. When the electric field $E(x)$ in the p-type region 10A ahead of the injection wavefront exceeds the impact ionization threshold $E_{tip}$, impact ionization is initiated. If the average field strength $\overline{E}$ created by the biasing voltage $V_s$ is sufficiently high, the impact ionization wave is initiated adjacent the cathode region 12. As the magnitude of the bias voltage $V_s$ is decreased, impact ionization occurs at successively greater distances from the cathode region 12.

After impact ionization, the wavefront travels from the point of initiation to the anode region 14 with very high velocity. As described, the electron avalanche is characterized by rapid increase in carrier conductivity which can be measured as a large current through the load resistor $R_L$. The increase in current may be detected by a voltage threshold device connected to point 20A, by a detector responsive to current rate of change, or the like. That the device provides a very fast detector is evidenced from Curves (C) of FIG. 2, in which the impact ionization wave travels the length of a 1.83 mm device in 1.4 nanoseconds.

The voltage source 16 preferably comprises a square wave generator or other pulsed source, as continuous biasing would result in excess heating of the device. Also, a pulsed source allows synchronized detection. That is, as impact ionization is terminated when an electric field is removed from the device, the termination of each biasing pulse resets the device for modulation or other purposes.

The detector may also function to quantitatively determine the amount of incident radiation. It will be noted from the previous discussion that the threshold voltage $E_{tip}$ for impact ionization depends not only on the energy given to each injected electron, but also on density of injected electrons. Accordingly, since $E_{tip}$ is variable, and if the average applied electric field $\overline{E}$ is maintained approximately equal to the expected $E_{tip}$, the actual point in the p-type region 10A at which impact ionization is initiated is dependent on the number of injected photoelectrons. This point can be determined by measuring the time difference between the application of the bias voltage and the large increase in current at the anode region 4 signifying arrival of the impact ionization wavefront.

For strictly qualitative detection, the response time of the device may be controlled by controlling the magnitude $V_s$ of the bias voltage. Again with reference to FIG. 2, the response time for a 1.83 mm long device is approximately 8.4 nanoseconds for an applied average field $\overline{E}$ = 420 volts/cm, and approximately 1.4 nanoseconds for an applied average field $\overline{E}$ = 710 volts/cm.

It is preferred that the diode be composed of p-type InSb. The anode region 14 may be doped with a suitable n-type dopant, that is, an alloy of tellurium and indium, and cathode region 12 may be doped with a suitable p+ type dopant, that is, an alloy of cadmium and indium. Exemplary indium antimonide material will have an energy band gap on the order of 0.22 ev at 77° K, a thermal equilibrium density of holes approximately equal to or less than $10^{13}$ $cm^{-3}$, and a ratio of hole effective mass to electron effective mass, $m_h/m_e$, of approximately 30.

Other narrow energy gap p-type semiconductor materials and alloys wherein the thermal equilibrium density of electrons is small and the ratio $m_h/m_e$ is large can be utilized to effect the present invention, for example, mercury cadmium telluride ($Hg_{1-x}Cd_xTe$) and lead tin telluride ($Pb_{1-x}Sn_xTe$). Different semiconductor materials can be used to change the wavelength or wavelength range over which the device is responsive.

What is claimed is:

1. An apparatus for high-speed detection and amplification of radiant energy, comprising:

a. a semiconductor diode means having a p+-type cathode region and an n-type anode region, said semiconductor diode means being composed primarily of a p-type material intermediate said cathode and anode regions which forms first and second diode junctions therewith, said p-type material being capable of impact ionization in response to electron injection when maintained within a predetermined range of temperatures, b. means maintaining said semiconductor means at one of said temperatures in said predetermined range, c. means exposing a portion of said p-type material adjacent said cathode region to radiant energy, and d. source means connected to said cathode and said anode regions for reverse-biasing said diode junctions with a biasing voltage having a magnitude sufficient to allow impact ionization to occur upon photoelectronic injection into said p-type material, but not high enough to cause breakdown of said junctions.

2. An apparatus as recited in claim 1, wherein said p-type material is indium antimonide.

3. An apparatus as recited in claim 2, wherein said p+-type cathode region comprises an alloy of cadmium and indium, and said n-type anode region comprises an alloy of tellurium and indium.

4. An apparatus as recited in claim 2, wherein the magnitude of said biasing voltage is sufficient to produce an average electric field strength within said p-type material greater than 300 volts/cm.

5. An apparatus as recited in claim 1, wherein said p-type material comprises mercury cadmium telluride.

6. An apparatus as recited in claim 1, wherein said p-type material comprises lead tin telluride.

7. An apparatus as recited in claim 1, wherein said source means comprises a pulse generator periodically pulsing said semiconductor diode means with said biasing voltage.

8. An apparatus as recited in claim 1, wherein said p+-type cathode region is optically transparent to thereby expose an end of said p-type material to radiant energy.

9. An apparatus as recited in claim 1, wherein said source means provides a selectively variable magnitude of said biasing voltage to thereby control the response time of said apparatus.

10. An apparatus as recited in claim 1, wherein said p+-type cathode region defines a window exposing the cathode end of said p-type material to radiant energy.

11. An apparatus as recited in claim 10, wherein said p+-type cathode region is formed in an annular ring having an interior aperture exposing said cathode end.

* * * * *